Patented Sept. 12, 1939

2,172,717

UNITED STATES PATENT OFFICE 2,172,717

HEAVY METAL COMPOUNDS OF SULPHYDRYL KERATINIC ACID AND PROCESS FOR PREPARING THE SAME

Ernst Sturm, Berlin-Lankwitz, and Richard Fleischmann, Berlin-Charlottenburg, Germany, assignors to Chemische Fabrik Johann a-Wulfing, Berlin, Germany No Drawing. Application February 17, 1936, Serial No. 64,414. In Germany February 18, 1935

15 Claims. (Cl. 260—114)

This invention relates to a process for preparing compounds derived from keratins which are particularly rich in heavy metal.

In German Patents Nos. 578,828 and 588,710 compounds are described in which metals or metal compounds are bound to sulphydryl keratin splitting products.

It has now been found that the solutions of metal sulphydryl keratin splitting products can be enriched with metal still further beyond the content of sulphydryl groups and that the metal-rich compounds isolated from them develop a substantially better chemotherapeutic activity than the compounds poorer in metal previously prepared. Thus, for example a gold sulphydryl compound prepared according to German Patent No. 578,828 shows an index of 1:80 to 1:133 in relapse infection of white mice and is active in a dose of 1/1200 to 1/2000 gm. per 20 gm. of animal, whereas in contradistinction thereto the new gold compounds for this infection are already active in doses of 1/5000 up to 1/8000 gm. Also, in the case of streptococci infection of white mice with the stock "Aronson", which is very difficult to influence chemotherapeutically, the new gold compounds show a superior healing effect and 80 to 100 per cent. of the infected mice are saved from death, whereas the previous compound kept on an average only 50 per cent. of the infected mice alive. In addition, pneumococci infection is very satisfactorily influenced by the compounds.

If the sulphydryls of sulphydryl keratinic acid are completely, or almost completely, oxidised by evaporation of their solution in the air, then the oxidised product takes up up to 20–25 per cent. of gold according to the sulphur content. If operations are carried out in the presence of sulphur dioxide, then no, or only a very little, gold is separated out on the interaction of gold chloride with the oxidised sulphydryl keratinic acid. The gold compounds prepared from the oxidised sulphydryl keratinic acid are active in relapse infection of white mice in doses of up to 1/8000 gm., and attain the remarkable index of 1:260 to 1:400.

The compounds which have been obtained from sulphydryl keratin splitting products by hydrolysis with hydrochloric acid up to solution followed by reduction with tin or zinc and the gold content of which, according to the statements in the literature, does not exceed 3.5 per cent. gold, are only slightly active towards the same infections. On the other hand, by an enrichment of the gold content to 8 per cent. and more they are so improved that they are already active in a dose of 1/1000 to 1/2000 gm. in relapse infection of white mice, and show an index of up to 1:100 and above. The antimony compound obtained according to German Patent Specification No. 588,710 likewise is improved when the antimony content is enriched to a sufficient extent. Their chemotherapeutic index in the case of mice nagana is raised from on an average 1:2 to 1:4—1:8. Obviously the SS-groups, which are already contained in the sulphydryl keratin splitting product before the interaction with the antimony salt, are still capable of taking up further metal, for if still further quantities of the antimony salt are added to the solutions obtained according to the German specification No. 588,710 before the precipitation no separation occurs and the resulting solution is perfectly clear and stable. On addition of alcohol an antimony-rich stable product is precipitated out of the solution which, as already mentioned above, possesses a considerable chemotherapeutic activity.

The gold compounds can be obtained by, after unbinding or oxidising the sulphydryls by means of gold, adding still further gold salt and neutralising the resulting acid reaction mixture as rapidly as possible with caustic soda up to neutral or weakly alkaline reaction. Although frequently a separation of metallic gold occurs, yet the quantity of gold separated out is always substantially less than that introduced, so that after separating off any gold which may have separated out the sodium salts of the gold-rich compounds can be obtained in the known manner by precipitation with alcohol.

In a similar manner products rich in heavy metal are also obtained with other heavy metal salts, such as for example silver, mercury, copper, lead, tin, zinc and iron salts. In the case of silver the neutralisation of the reaction mixture is only to be effected when the precipitate which has formed has for the most part dissolved again on standing.

*Example 1.*—Ten grams of the sulphydryl keratinic acid obtained according to German Patent No. 578,828 are dissolved in the five-fold quantity of water. To this solution 5 gm. of $AuCl_3$ in 25 ccm. of $H_2O$ are added whilst stirring and in small portions. A precipitate appears first of all which, however, disappears again on stirring. Only towards the end of the interaction does the precipitate no longer go into solution. It is now directly mixed with care with concentrated caustic soda until a very weak alkaline reaction is shown, filtered off from any gold which may have separated out, and the clear solution stirred into the multi-fold quantity of alcohol. A solid, practically white, product precipitates out thereby, which is washed with alcohol and dried in vacuo. It is very readily soluble in water with neutral reaction and yellowish colour.

Example 2.—Five grams of a sulphydryl keratinic acid oxidised by evaporation in the air are dissolved in 50 ccm. of water and gradually treated with a solution of 2 gm. of $AuCl_3$ in 15 ccm. of water in small portions. A yellowish precipitate separates out which, on stirring, at first goes up into solution again. On further addition of $AuCl_3$, however, the precipitate appearing in the acid reaction mixture can no longer be brought into solution. It dissolves only on addition of caustic soda still with acid reaction. The caustic soda is added up to weakly alkaline reaction and, after filtration, a bright product, which is readily soluble in water with neutral reaction, is precipitated out of the clear solution by stirring into the multi-fold quantity of alcohol.

Example 3.—Five grams of sulphydryl keratinic acid oxidised by evaporation in the air are dissolved in 25 ccm. of water and $SO_2$ is led into the solution up to saturation. A solution of 1.7 gm. of $AuCl_3$ in 8.5 ccm. of water is cautiously added thereto in small portions and whilst thoroughly stirring. A yellowish precipitate comes out, which, however, immediately goes up into solution again, and after complete addition of the gold trichloride a yellow solution is obtained from which, even on standing over night, no, or only very little, gold is separated out. Neutralisation is effected with caustic soda whilst cooling and the fine lemon-yellow coloured solution stirred into alcohol, whereby an approximately white product precipitates out which is filtered off at the pump, washed with alcohol and dried in vacuo. It is very readily soluble in water with yellow colour and neutral or weakly alkaline reaction. It contains 15 to 16 per cent. inorganic salts (sodium sulphate and so forth).

Example 4.—Five grams of the sulphydryl albumose obtained by hydrochloric acid hydrolysis of keratin substances up to dissolution, followed by reduction with tin, removal of the metal by means of hydrogen sulphide, evaporation of the filtrate in vacuum down to dryness, taking up in alcohol and precipitation from the alcoholic solution are dissolved in 25 ccm. of water. To the solution 1.7 gms of $AuCl_3$ in 8.5 ccm. of water are added in portions and whilst stirring. A yellow precipitate is obtained which, however, goes up into solution again on stirring. Only towards the end of the reaction does a small quantity of the precipitate remain undissolved. It is immediately treated with caustic soda whereby at first a clear solution is formed from which, however, a small quantity of gold forthwith separates. The liquid is filtered off from the small amount of gold which has separated out and the solution is stirred into the multifold quantity of alcohol, whereupon a solid bright product is obtained which is readily soluble in water with neutral reaction and yellowish colour.

Example 5.—A solution of 6 gms. of silver nitrate in 24 ccm. of water is stirred in portions into a solution in 50 ccm. of water of 10 gms. of the sulphydryl keratinic acid obtained according to German Patent No. 578,828. A white precipitate comes down which, on stirring, at first dissolves up again. On further addition, however, a precipitate remains undissolved. The reaction mixture is allowed to stand until the precipitate, except for a small residue, has gone into solution again. Neutralisation is now effected with caustic soda and the solution worked up as in the preceding examples. The bright coloured product obtained in this way is readily soluble in water with neutral reaction.

Example 6.—Ten grams of the sulphydryl keratinic acid obtained according to German Patent No. 578,828 are dissolved in 50 ccm. of water and to the solution are added, whilst stirring and in portions, 3 gms. of mercuric acetate dissolved in 15 ccm. of water. At first a white precipitate comes down which goes up into solution again on stirring. On further addition, however, the precipitate remains undissolved. The reaction mixture is treated with caustic soda up to weak alkaline reaction as a result of which the precipitate goes into solution except for a very small residue. The solution is worked up as in the preceding examples. The white product obtained thus is readily soluble in water with neutral reaction.

Example 7.—Five grams of the oxidised sulphydryl keratinic acid obtained by many times evaporating an aqueous sulphydryl keratinic acid solution in the air are dissolved in 25 ccm. of water. Into the solution is stirred little by little a solution of 1 gm. of copper acetate dissolved in 15 ccm. of water. At first the solution assumes a dark olive brown colour and on further addition dark green, and a precipitate deposits. On addition of caustic soda up to weakly alkaline reaction it goes up into solution again except for a small residue. The dark olive brown solution is worked up as in the preceding examples. The grey product obtained in this way is readily soluble in water with olive brown colour and neutral reaction.

Example 8.—Two grams of lead acetate dissolved in 10 ccm. of water are stirred into a solution of 5 gms. of sulphydryl keratinic acid in 25 ccm. of water. A partial precipitation already takes place, and this is completed by stirring into the multifold quantity of alcohol. After thorough washing with alcohol and drying in vacuo a white product is obtained.

Example 9.—Ten grams of the sulphydryl keratinic acid obtained according to German Patent No. 578,828 are dissolved in 50 ccm. of water and to the solution 4.16 gms. of sodium antimonyl tartrate are added. Dissolution of the sodium antimonyl tartrate forthwith takes place without any precipitation. On stirring into the multifold quantity of ethyl alcohol a white product separates out which is filtered off at the pump, washed with alcohol and dried in vacuum. It dissolves in water with weakly acid reaction. The aqueous solution may be neutralised with sodium bicarbonate without any precipitation taking place.

Example 10.—A solution of 2.5 gms. of stannous chloride in 14 ccm. of water is stirred into a solution in 50 ccm. of water of 10 gms. of the sulphydryl keratinic acid obtained according to German Patent No. 578,828. The reaction mixture is neutralised, whilst cooling, with concentrated caustic soda, whereupon a voluminous white precipitate, which appears at first, goes up into solution again, and after filtration is stirred into the multifold quantity of alcohol. A solid white product forthwith separates out thereby which is filtered off at the pump, washed with alcohol and dried in vacuo. It is readily soluble in water with neutral reaction.

Example 11.—Five grams of the oxidised sulphydryl keratinic acid obtained by many times evaporating in the air an aqueous sulphydryl keratinic acid solution are dissolved in 25 ccm. of water and to the same are added thereto 1.2 gms. of crystallised stannic chloride dissolved in 6 ccm. of water. The reaction mixture is neutralised with caustic soda, filtered, and worked up as in the preceding example. The yellowish-white product is readily soluble in water with neutral to weakly alkaline reaction.

*Example 12.*—Ten grams of the oxidised sulphydryl keratinic acid prepared as in the preceding example are dissolved in 50 ccm. of water and 3 gms. of zinc acetate dissolved in 8 ccm. of water are added thereto. The turbid solution is mixed with caustic soda until the white precipitate appearing at first has almost completely gone up into solution again, and the solution, thereupon filtered, worked up as in the preceding examples. The approximately white product is readily soluble in water with weakly alkaline reaction and yellowish colour.

*Example 13.*—Into a solution in 50 ccm. of water of 10 gms. of the sulphydryl keratinic acid obtained according to German Patent No. 578,828 are stirred 3 gms. of ferrous sulphate dissolved in 15 ccm. of water. The resulting solution is neutralized with caustic soda and thereupon forthwith stirred into alcohol. The precipitated product is rapidly filtered at the pump, washed with alcohol, and dried in vacuum in order as far as possible to exclude oxidation by the oxygen of the air.

Having now described our invention what we claim as new and desire to secure by Letters Patent is:

1. A process for preparing compounds derived from keratin which are particularly rich in heavy metal, consisting in hydrolysing keratin material with acid at least to the stage of formation of a gelatinous product, reducing the product with a metal, freeing the reduced product from metal, treating the product with a quantity of heavy metal, in the form of a soluble salt thereof, which is at least about double that necessary for saturating the sulphydryl groups of the said product, neutralising the mixture with alkali, and filtering off any deposit which may form as a result of the neutralisation, introducing the solution into an organic solvent, and separating the compound rich in heavy metal which is deposited.

2. A process for preparing compounds derived from keratin which are particularly rich in heavy metal, consisting in treating a solution of sulphydryl keratinic acid with a solution of a heavy metal salt containing a quantity of heavy metal which is at least about double that necessary for saturating the sulphydryl groups of the acid, neutralising the mixture with alkali, and filtering off any deposit which may form as a result of the neutralisation, introducing the solution into an organic solvent, and separating the compound rich in heavy metal which is deposited.

3. A process as claimed in claim 1 in which, before treatment with the heavy metal salt, the sulphydryl groups of the keratin degradation product are at least partly removed by oxidation.

4. A process as claimed in claim 2 in which, before treatment with heavy metal salt, the sulphydryl groups of the sulphydryl keratinic acid are at least partly removed by oxidation.

5. A process as claimed in claim 1 in which, before treatment with heavy metal salt, the sulphydryl groups of the sulphydryl keratin degradation product are at least partly oxidised by evaporation of the said product in the air.

6. A process as claimed in claim 2 in which, before treatment with heavy metal salt, the sulphydryl groups of the sulphydryl keratinic acid are at least partly oxidised by evaporating an aqueous solution of the acid in the air, the residue being dissolved in water for treatment with the heavy metal salt.

7. A process for preparing compounds derived from keratin which are particularly rich in heavy metal, consisting in hydrolysing keratin material with acid at least to the stage of formation of a gelatinous product, reducing the product with a metal, freeing the reduced product from metal, treating the product with a soluble salt of a metal selected from the following group of heavy metals: gold, silver, mercury, copper, lead, antimony, tin, zinc and iron, the quantity of metal used being at least about double that necessary for saturating the sulphydryl groups of the keratin degradation product, neutralising the mixture with alkali, and filtering off any deposit which may form as a result of the neutralisation, introducing the solution into an organic solvent, and separating the compound rich in heavy metal which is deposited.

8. A process for preparing compounds derived from keratin which are particularly rich in heavy metal, consisting in treating a solution of sulphydryl keratose (albumose) with a solution of a salt of a metal selected from the following group of heavy metals: gold, silver, mercury, copper, lead, antimony, tin, zinc and iron, the quantity of metal used being at least about double that necessary for saturating the sulphydryl groups of the keratinic acid, neutralising the mixture with alkali, and filtering off any deposit which may form as a result of the neutralisation, introducing the solution into an organic solvent, and separating the compound rich in heavy metal which is deposited.

9. A process as claimed in claim 1 in which the organic solvent used is alcohol.

10. A process as claimed in claim 2 in which the organic solvent used is alcohol.

11. A process for making a compound derived from keratin which is rich in gold, consisting in treating sulphydryl keratinic acid dissolved in water with about half its weight of auric chloride also dissolved in water, adding caustic alkali until the solution shows only a weakly alkaline reaction, filtering off any deposit which may separate out, stirring the clear solution into an excess of alcohol, and separating the gold-rich compound which precipitates.

12. A process for making a compound derived from keratin which is rich in gold, consisting in dissolving oxidised sulphydryl keratinic acid in water, saturating the solution with sulphur dioxide, adding in small portions a solution containing a weight of auric chloride equal to about one-third of the weight of oxidised sulphydryl keratinic acid taken, neutralising the mixture with caustic alkali whilst cooling, stirring the resulting solution into alcohol, and separating the gold-rich product which is precipitated.

13. A process for making a compound derived from keratin which is rich in silver, consisting in treating sulphydryl keratinic acid in solution with a solution containing at least one half of its weight of silver nitrate, allowing the mixture to stand until the precipitate has for the most part gone up into solution, removing any residue, neutralising the solution with caustic alkali, filtering off any deposit which may separate out, stirring the solution into an excess of alcohol and separating the silver-rich compound which precipitates.

14. A process for making a compound derived from keratin which is rich in antimony, consisting in treating sulphydryl keratinic acid in aqueous solution with at most half its weight or less of sodium antimonyl tartrate, stirring the resulting liquid into alcohol and separating the antimony compound which precipitates.

15. Heavy metal compounds of sulphydryl keratinic acid containing about twice as much heavy metal as the sulphydryl groups are capable of binding.

ERNST STURM.
RICHARD FLEISCHMANN.